United States Patent
Salm et al.

(10) Patent No.: US 9,434,017 B2
(45) Date of Patent: Sep. 6, 2016

(54) BRAZE METHODS AND COMPONENTS WITH HEAT RESISTANT MATERIALS

(71) Applicant: General Electric Company, Schenectady, NY (US)

(72) Inventors: Jacob Andrew Salm, Greenville, SC (US); Srikanth Chandrudu Kottilingam, Simpsonville, SC (US); Jonathan Matthew Lomas, Simpsonville, SC (US); Gareth William David Lewis, Greenville, SC (US); Cem Murat Eminoglu, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 163 days.

(21) Appl. No.: 14/318,956

(22) Filed: Jun. 30, 2014

(65) Prior Publication Data
US 2015/0375322 A1    Dec. 31, 2015

(51) Int. Cl.
| | |
|---|---|
| B23K 31/02 | (2006.01) |
| B23K 1/00 | (2006.01) |
| B23K 1/19 | (2006.01) |
| B23K 35/30 | (2006.01) |
| F01D 5/14 | (2006.01) |
| F01D 5/22 | (2006.01) |
| B23K 35/02 | (2006.01) |
| C22C 19/00 | (2006.01) |

(52) U.S. Cl.
CPC .............. *B23K 1/0018* (2013.01); *B23K 1/19* (2013.01); *B23K 35/0244* (2013.01); *B23K 35/3046* (2013.01); *C22C 19/002* (2013.01); *F01D 5/147* (2013.01); *F01D 5/225* (2013.01); *B23K 2201/001* (2013.01); *F05D 2230/22* (2013.01); *F05D 2230/237* (2013.01); *Y02T 50/671* (2013.01)

(58) Field of Classification Search
None
See application file for complete search history.

(56) References Cited

U.S. PATENT DOCUMENTS

| | | | |
|---|---|---|---|
| 2,718,162 | A | 9/1955 | Smith |
| 3,561,886 | A | 2/1971 | Kreischer, Jr. et al. |
| 6,354,799 | B1 | 3/2002 | Mukira et al. |
| 6,726,086 | B2 | 4/2004 | Philip |
| 6,884,028 | B2 | 4/2005 | Brauer et al. |
| 6,914,210 | B2 | 7/2005 | Grossklaus, Jr. et al. |
| 7,051,435 | B1 * | 5/2006 | Subramanian ....... B23K 1/0018 29/402.11 |
| 7,335,427 | B2 | 2/2008 | Sathian |
| 7,506,793 | B2 | 3/2009 | Sathian |
| 8,440,264 | B2 | 5/2013 | Lazarz et al. |

(Continued)

FOREIGN PATENT DOCUMENTS

| | | | | |
|---|---|---|---|---|
| DE | WO 2011113831 A1 * | 9/2011 | ............. | B23P 6/005 |
| WO | 2013115887 A2 | 8/2013 | | |

Primary Examiner — Kiley Stoner
(74) Attorney, Agent, or Firm — Ernest G. Cusick; Frank A. Landgraff

(57) ABSTRACT

Braze methods include providing a substrate comprising a pre-sintered preform disposed thereon, wherein the pre-sintered preform comprises a mixture comprising a base alloy comprising about 30 weight percent to about 90 weight percent of the mixture and a second alloy comprising a sufficient amount of melting point depressant to have a lower melting temperature than the base alloy. Braze methods further include at least partially covering the pre-sintered preform with a heat resistant material, wherein a melt temperature of the heat resistant material is higher than a melt temperature of the pre-sintered preform, and heating the pre-sintered preform on the substrate.

11 Claims, 5 Drawing Sheets

(56) References Cited

U.S. PATENT DOCUMENTS

| | | |
|---|---|---|
| 8,573,949 B2 | 11/2013 | Cui et al. |
| 8,703,044 B2 | 4/2014 | Sathian et al. |
| 2001/0019781 A1 | 9/2001 | Hasz |
| 2007/0154338 A1* | 7/2007 | Sathian ............... B23K 1/0018 419/5 |
| 2008/0017694 A1* | 1/2008 | Schnell ............... B23K 35/304 228/119 |
| 2009/0041611 A1* | 2/2009 | Sathian ............. B23K 35/3046 419/29 |
| 2010/0325887 A1* | 12/2010 | Perret ................ B23K 1/0018 29/888.011 |
| 2011/0076151 A1* | 3/2011 | Cui ..................... B23K 1/0056 416/232 |
| 2011/0244264 A1* | 10/2011 | Anton ................ B23K 1/0018 428/613 |
| 2012/0308843 A1* | 12/2012 | Ott ....................... B23K 1/0018 428/614 |
| 2013/0156555 A1 | 6/2013 | Budinger et al. |
| 2013/0195238 A1 | 8/2013 | Ohmori et al. |
| 2013/0195642 A1 | 8/2013 | Hunt et al. |
| 2014/0154082 A1* | 6/2014 | Shinn .................. B23K 1/0018 416/191 |
| 2014/0170433 A1* | 6/2014 | Schick ..................... B22F 7/08 428/548 |
| 2014/0212681 A1* | 7/2014 | Cui ....................... B23K 20/12 428/548 |
| 2014/0260327 A1* | 9/2014 | Kottilingam .......... F01D 11/001 60/806 |
| 2015/0030460 A1* | 1/2015 | Kottilingam ............ F01D 5/182 416/97 R |
| 2015/0044059 A1* | 2/2015 | Wassynger ............. F01D 5/005 416/97 R |
| 2015/0369068 A1* | 12/2015 | Kottilingam ............. B22F 7/08 415/116 |

* cited by examiner

BRAZE METHODS AND COMPONENTS WITH HEAT RESISTANT MATERIALS

BACKGROUND OF THE INVENTION

The subject matter disclosed herein relates to braze methods and components and, more specifically, to braze methods and components with heat resistant materials.

A wide variety of industry components may undergo a braze operation to add new material, modify existing material, modify the shape of a component, join multiple components together, or otherwise alter the original component. The braze operation may generally comprise heating a filler metal above its melting temperature (i.e., above its liquidus temperature) while disposed on a base substrate (i.e., the original component) and subsequently cool the materials to join the filler metal and the base substrate together.

Various turbine components may, for example, undergo one or more braze cycles during original manufacture or modification pre or post utilization in a turbine. Some particular turbine components may also possess very high strength, toughness and/or other physical properties to facilitate sustained operation. Turbine components such as buckets (blades), nozzles (vanes), and other hot gas path components and combustions components of industrial and aircraft gas turbine engines may be formed of nickel, cobalt or iron-base superalloys with suitable mechanical and environmental properties.

Braze operations are typically limited to those surfaces requiring modification. For example, surfaces subject to contact with adjacent components during turbine operation, such as the z-notch surface of a turbine bucket shroud, may be more prone to wear or the like and therefore may be more likely to undergo future braze operations. However, as turbine components increase in size to increase overall power output, surfaces that were not previously known to experience contact during operation may also experience wear. For example, larger turbine components may be subject to increased oscillation during turbine start-up. This oscillation may cause increased contact to surfaces including seal rails, z-notch adjacent surfaces and angel wings, collectively referred to herein as non-z-notch contact surfaces. Modification of these surfaces, such as after extended use, may become laborious and costly. Welding, for example, may be difficult due to the relative small amount of material available to disperse heat to prevent cracking.

Moreover, in even some instances, because the efficiency of a turbomachine can be at least partially dependent on its operating temperatures, there may be a demand for components such as turbine buckets and nozzles to be capable of withstanding increasingly higher temperatures. As the maximum local temperature of a superalloy component approaches the melting temperature of the superalloy, forced air cooling may become necessary. For this reason, airfoils of gas turbine buckets and nozzles may include complex cooling schemes in which air, typically bleed air, is forced through internal cooling passages within the airfoil and then discharged through cooling holes at the airfoil surface to transfer heat from the component. Cooling holes can also be configured so that cooling air serves to film cool the surrounding surface of the component. Depending on the manufacturing operation, one or more portions of the cooling passages may need to be stopped off, such as by using braze or pre-sintered preforms, to force the flow of air in the appropriate direction. However, the braze or pre-sintered preform may be subject to elevated temperatures during heat treatment operations such as material rejuvenation processes, repair processes, or the like. These elevated temperatures may cause the braze or pre-sintered preform to partially melt or otherwise change shape (e.g., slump) thereby creating additional manufacturing operations.

Accordingly, alternative braze methods and components with heat resistant materials would be welcome in the art.

BRIEF DESCRIPTION OF THE INVENTION

In one embodiment, a braze method is disclosed. The braze method includes providing a substrate comprising a pre-sintered preform disposed thereon, wherein the pre-sintered preform comprises a mixture comprising a base alloy comprising about 30 weight percent to about 90 weight percent of the mixture and a second alloy comprising a sufficient amount of melting point depressant to have a lower melting temperature than the base alloy. The braze method further includes at least partially covering the pre-sintered preform with a heat resistant material, wherein a melt temperature of the heat resistant material is higher than a melt temperature of the pre-sintered preform, and heating the pre-sintered preform on the substrate.

In another embodiment, a modified component is disclosed. The modified component comprises a pre-sintered preform bonded to a substrate, wherein the pre-sintered preform comprises, prior to bonding to the modification surface, a base alloy comprising about 30 weight percent to about 90 weight percent of the mixture and a second alloy comprising a sufficient amount of melting point depressant to have a lower melting temperature than the base alloy. The modified component further comprises a heat resistant material at least partially covering the pre-sintered preform, wherein a melt temperature of the heat resistant material is higher than a melt temperature of the pre-sintered preform.

These and additional features provided by the embodiments discussed herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
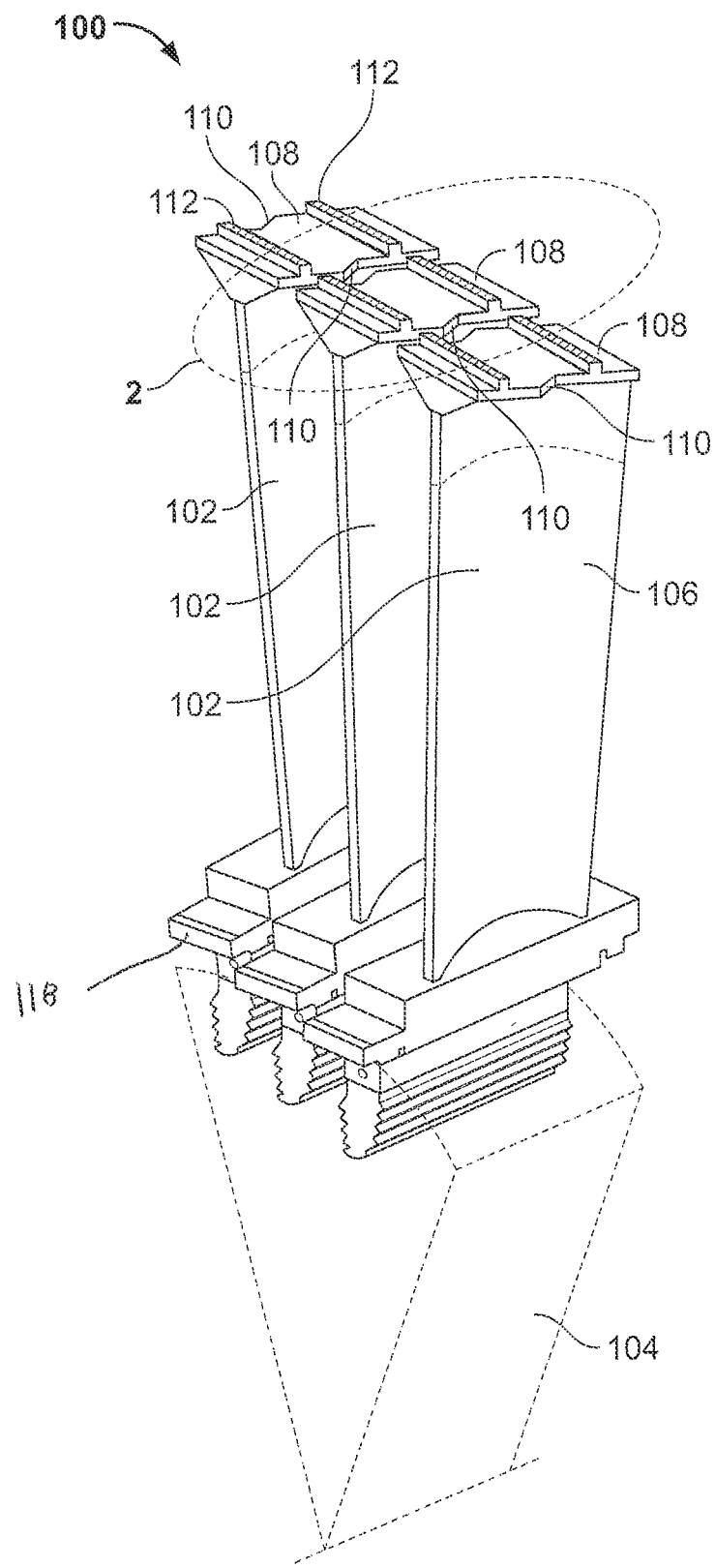
FIG. 1 is a side perspective view of a section of an exemplary combustion turbine engine according to one or more embodiments shown or described herein.

Referring now to FIG. 1, a side perspective view of a section of an exemplary combustion turbine engine 100 is illustrated. Engine 100 comprises a plurality of different components, each of which may comprise one or more substrates subject to the present disclosure. Specifically, engine 100 comprises a plurality of turbine buckets 102 coupled to a hub 104. As used herein, "turbine bucket" refers to any stage bucket, blade, vane or the like. Hub 104 is coupled to a turbine shaft (not shown in FIG. 1). Each of buckets 102 have a corresponding airfoil 106 and a corresponding turbine bucket shroud 108 fixedly coupled to airfoil 106 at the radially outermost extremity of airfoil 106. Each shroud 108 has two correspondingly opposite Z-notches 110 with only one for each shroud 108 illustrated. Each shroud 108 further comprises a plurality of z-notch adjacent surfaces 116 (i.e., the surfaces directly adjacent to the z-notch 110 that face the adjacent shroud 108. Seal rails 112 facilitate coupling a substantially arcuate seal ring (not shown in FIG. 1) to shrouds 108 to facilitate mitigation of bucket 102 circumferential movement and vibration.

Figure 2:
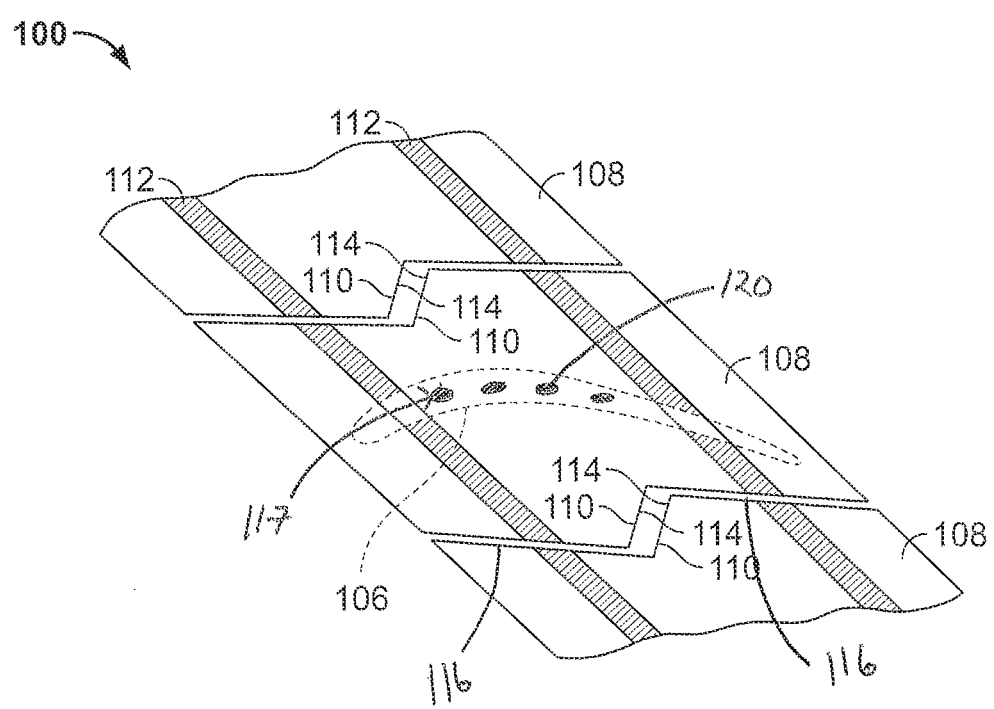
FIG. 2 is a fragmentary overhead perspective view of a plurality of turbine bucket shrouds according to one or more embodiments shown or described herein.

The portion of FIG. 1 enclosed by the bold dotted line and labeled 2 is illustrated in FIG. 2. Specifically, FIG. 2 illustrates a fragmentary overhead perspective view of turbine bucket shrouds 108. Shrouds 108 are illustrated with Z-notches 110 on each end and z-notch adjacent surfaces 116. Z-notches 110 have a mating surface 114. Airfoil 106 (in outline) and seal rails 112 are illustrated in part to provide perspective on the orientation.

The components and substrates disclosed herein, including shrouds 108, can comprise any metal or alloy substrate suitable for a braze application. Specifically, the present disclosure is generally applicable to any metal or alloy component that may be brazed, particularly those components that operate within environments characterized by relatively high stresses and/or temperatures. Notable examples of such components include turbine components such as turbine buckets (blades), nozzles (vanes), shrouds, and other hot gas path and combustion components of a turbine, such as an industrial gas or steam turbine or an aircraft gas turbine engine.

For example, in some embodiments, the substrates disclosed herein, including shrouds 108, may comprise a nickel-, cobalt-, or iron-based superalloys. For example, the substrate may comprise nickel-based superalloys such as René N4, René N5, René 108, GTD-111®, GTD-222®, GTD-444®, IN-738 and MarM 247 or cobalt-based superalloys such as FSX-414. The substrate 12 may be formed as an equiaxed, directionally solidified (DS), or single crystal (SX) casting to withstand relatively higher temperatures and stresses such as may be present within a gas or steam turbine.

Figure 3:
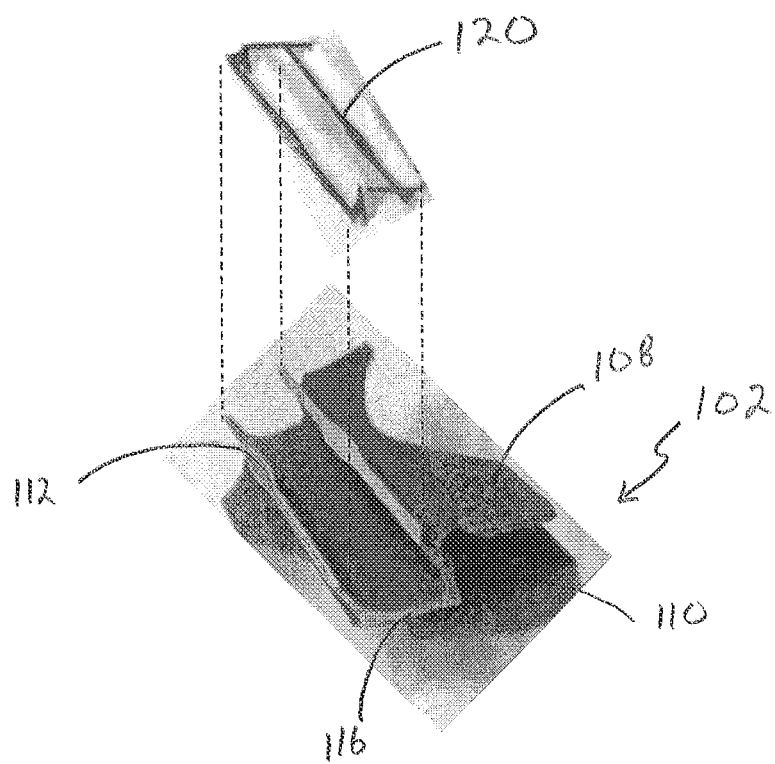
FIG. 3 is an exploded fragmentary perspective view of a shroud in FIG. 2 with a pre-sintered preform according to one or more embodiments shown or described herein.

Referring now to FIGS. 1-3, the turbine bucket 102 comprises a plurality of non-z-notch contact surfaces 111. As used herein, "non-z-notch contact surfaces" 111 refer to the surfaces of the turbine bucket 102 that may contact adjacent components during initial start-up and/or operation excluding the z-notch 110 itself. These surfaces may also sometimes be referred to in the art as "non-contact surfaces" due to their previous low likelihood to contact adjacent components, let alone contact adjacent components to the point of potentially needing modification. Non-z-notch contact surfaces 111 specifically include seal rails 112, z-notch adjacent surfaces 116, and angel wings 118. In some embodiments, these non-z-notch contact surfaces 111 may experience contact with adjacent components during situations including initial start-up, and transient and steady states of the turbine engine 100 and the resulting oscillation.

The non-z-notch contact surfaces 111 may be modified utilizing a pre-sintered preform 120 to form a modified turbine bucket shroud 108. Specifically, modified turbine bucket shroud 108 may comprise a modification surface that comprises one or more portions of the non-z-notch contact surfaces 111. The modification surface may be prepped, such as by removing original material, and a pre-sintered preform 120 may bonded thereto to modify the turbine bucket shroud 108 (e.g., modify it back into its original shape or dimensions).

The pre-sintered preform 120 generally comprises a mixture of particles comprising a base alloy and a second alloy that have been sintered together at a temperature below their melting points to form an agglomerate and somewhat porous mass. Suitable particle size ranges for the powder particles include 150 mesh, or even 325 mesh or smaller to promote rapid sintering of the particles and minimize porosity in the pre-sintered preform 120 to about 10 volume percent or less. In some embodiments, the density of the pre-sintered preform 120 has a density of 90% or better. In even some embodiments, the pre-sintered preform 120 has a density of 95% or better.

The base alloy of the pre-sintered preform 120 can comprise any composition such as one similar to the substrate (e.g., the turbine bucket shroud 108) to promote common physical properties between the pre-sintered preform 120 and the substrate. For example, in some embodiments, the base alloy (of the pre-sintered preform 120) and the substrate (e.g., the turbine bucket shroud 108) share a common composition (i.e., they are the same type of material). In some embodiments, the base alloy can comprise nickel-based superalloys such as René N4, René N5, René 108, GTD-111®, GTD-222®, GTD-444®, IN-738 and MarM 247 or cobalt-based superalloys such as FSX-414 as discussed above. In some embodiments, the properties for the base alloy include chemical and metallurgical compatibility with the substrate (e.g., the turbine bucket shroud 108), such as high fatigue strength, low tendency for cracking, oxidation resistance and/or machinability.

In some embodiments, the base alloy may comprise a melting point of within about 25° C. of the melting temperature of the substrate 12. In some embodiments, the base alloy may comprise a compositional range of, by weight, about 2.5 to 11% cobalt, 7 to 9% chromium, 3.5 to 11% tungsten, 4.5 to 8% aluminum, 2.5 to 6% tantalum, 0.02 to 1.2% titanium, 0.1 to 1.8% hafnium, 0.1 to 0.8% molybdenum, 0.01 to 0.17% carbon, up to 0.08% zirconium, up to 0.60 silicon, up to 2.0 rhenium, the balance being nickel and incidental impurities. In even some embodiments, the base alloy may comprise a compositional range of, by weight, about 9 to 11% cobalt, 8 to 8.8% chromium, 9.5 to 10.5% tungsten, 5.3 to 5.7% aluminum, 2.8 to 2.3% tantalum, 0.9 to 1.2% titanium, 1.2 to 1.6% hafnium, 0.5 to 0.8% molybdenum, 0.13 to 0.17% carbon, 0.03 to 0.08% zirconium, the balance nickel and incidental impurities.

In even some embodiments, the base alloy may comprise Tribaloy T-800 commercially available from WESGO Ceramics. Such a base alloy may comprise a compositional range of, by weight, about 27.0 to 30.0% molybdenum, 16.5 to 18.5% chromium, 3.0 to 3.8% silicon, up to 1.5% iron, up to 1.5% nickel, up to 0.15% oxygen, up to 0.08% carbon, up to 0.03% phosphorus, up to 0.03% sulfur, and the balance cobalt. In some embodiments, the base alloy may comprise Coast Metal 64, sometimes referred to as CM-64 or CM64, commercially available from WESGO Ceramics. Such a base alloy may comprise a compositional range of, by weight, 26.0 to 30.0% chromium, 18.0 to 21.0% tungsten, 4.0 to 6.0% nickel, 0.75 to 1.25% vanadium, 0.7 to 1.0% carbon, 0.005 to 0.1% boron, up to 3.0% iron, up to 1.0% magnesium, up to 1.0% silicon, up to 0.5% molybdenum and the balance cobalt.

It should be appreciated that while specific materials and compositions have been listed herein for the composition of the base alloy of the pre-sintered preform 120, these listed materials and compositions are exemplary only and non-limiting and other alloys may alternatively or additionally be used. Furthermore, it should be appreciated that the particular composition of the base alloy for the pre-sintered preform 120 may depend on the composition of the substrate (e.g., the turbine bucket shroud 108).

As discussed above, the pre-sintered preform 120 further comprises a second alloy. The second alloy may also have a composition similar to the substrate (e.g., the turbine bucket shroud 108) but further contain a melting point depressant to promote sintering of the base alloy and the second alloy particles and enable bonding of the pre-sintered preform 120 to the substrate (e.g., the turbine bucket shroud 108) at temperatures below the melting point of the substrate. For example, in some embodiments the melting point depressant can comprise boron and/or silicon.

In some embodiments, the second alloy may comprise a melting point of about 25° C. to about 50° C. below the grain growth or incipient melting temperature of the substrate (e.g., the turbine bucket shroud 108). Such embodiments may better preserve the desired microstructure of the substrate (e.g., the turbine bucket shroud 108) during the heating process. In some embodiments, the second alloy may comprise a compositional range of, by weight, about 9 to 10% cobalt, 11 to 16% chromium, 3 to 4% aluminum, 2.25 to 2.75% tantalum, 1.5 to 3.0% boron, up to 5% silicon, up to 1.0% yttrium, the balance nickel and incidental impurities. For example, in some embodiments the second alloy may comprise commercially available Amdry DF4B nickel brazing alloy.

In even some embodiments, the second alloy may comprise MAR M-509B commercially available from WESGO Ceramics. Such a second alloy may comprise a compositional range of, by weight, about 22.9 to 24.75% chromium, 9.0 to 11.0% nickel, 6.5 to 7.6% tungsten, 3.0 to 4.0 percent tantalum, 2.6 to 3.16% boron, 0.55 to 0.65% carbon, 0.3 to about 0.6% zirconium, 0.15 to 0.3% titanium, up to 1.3% iron, up to 0.4% silicon, up to 0.1% manganese, up to 0.02% sulfur and the balance cobalt.

It should also be appreciated that while specific materials and compositions have been listed herein for the composition of the second alloy of the pre-sintered preform 120, these listed materials and compositions are exemplary only and non-limiting and other alloys may alternatively or additionally be used. Furthermore, it should be appreciated that the particular composition of the second alloy for the pre-sintered preform 120 may depend on the composition of the substrate (e.g., the turbine bucket shroud 108).

The pre-sintered preform 120 can comprise any relative amounts of the base alloy and the second alloy that are sufficient to provide enough melting point depressant to ensure wetting and bonding (e.g., diffusion/brazing bonding) of the particles of the base alloy and the second alloy to each other and to the outer surface of the substrate (e.g., the turbine bucket shroud 108). For example, in some embodiments the second alloy can comprise at least about 10 weight percent of the pre-sintered preform 120. In some embodiments the second alloy can comprise no more than 70 weight percent of the pre-sintered preform 120.

In even some embodiments, the base alloy may comprise T-800 or CM-64 and the second alloy may comprise MAR-M-509B. In such embodiments, the ratio of T-800/CM-64 to MAR-M-509B is 80%-85% T-800/CM-64 to 20%-15% MAR-M-509B. Alternatively, ratios of T-800/CM-64 to MAR-M-509B of 90%-60% T-800/CM-64 to 10%-40% MAR-M-509B may be used.

Such embodiments may provide a sufficient amount of melting point depressant while limiting potential reduction of the mechanical and environmental properties of the subsequent heating. Furthermore, in these embodiments, the base alloy can comprise the remainder of the pre-sintered preform 120 (e.g., between about 30 weight percent and about 70 weight percent of the pre-sintered preform). In even some embodiments, the particles of the base alloy can comprise about 40 weight percent to about 70 weight percent of the pre-sintered preform 120 with the balance of the composition comprising particles of the second alloy. It should be appreciated that while specific relative ranges of the base alloy and the second alloy have been presented herein, these ranges are exemplary only and non-limiting and any other relative compositions may also be realized such that a sufficient amount of melting point depressant is provided as discussed above.

Aside from the particles of the base alloy and the second alloy, no other constituents may be required within the pre-sintered preform 120. However, in some embodiments, a binder may be initially blended with the particles of the base alloy and the second alloy to form a cohesive mass that can be more readily shaped prior to sintering. In such embodiments, the binder can include, for example, a binder commercially available under the name NICROBRAZ-S from the Wall Colmonoy Corporation. Other potentially suitable binders include NICROBRAZ 320, VITTA GEL from Vitta Corporation, and others including adhesives commercially available from Cotronics Corporation, all of which may volatilize cleanly during sintering.

The pre-sintered preform 120 may be formed by mixing the powder particles of the base alloy (i.e., base alloy particles) and the second alloy (i.e., second alloy particles) by any suitable means such as stirring, shaking, rotating, folding or the like or combinations thereof. After mixing, the mixture may be combined with the binder (i.e., to form a combined powder mixture) and cast into shapes (i.e., to form a compacted preform), during and/or after which the binder can be burned off. The compacted preform may then be placed in a non-oxidizing (vacuum or inert gas) atmosphere furnace for the sintering operation, during which the powder particles of the base alloy and the second alloy undergo sintering to yield the pre-sintered preform with good structural strength and low porosity. Suitable sintering temperatures may at least in part depend on the particular compositions of the particles of the base alloy and the second alloy. For example, in some embodiments, the sintering temperature may be in a range of about 1010° C. to about 1280° C. In some embodiments, following sintering, the pre-sintered preform can be HIPed or vacuum pressed to achieve densities greater than 95%. In even some embodiments, an additional layer of boron-containing material may be disposed between the pre-sintered preform 120 and the non-z-notch contact surface 111 to help increase the concentration of diffused boron in the bond between the two.

The pre-sintered preform 120 may further be heated to bond with the non-z-notch contact surface 111 using any suitable temperature, heat source(s), iterations, ramp rate, hold time, cycle and any other relevant parameters. For example, in some embodiments, to facilitate the bonding process, a non-oxidizing atmosphere within the furnace and a method of inducing a pressure on pre-sintered preform 120 may be provided. To obtain a non-oxidizing atmosphere, a vacuum may be formed in the furnace with a pressure of approximately 0.067 Pascal (Pa) (0.5 milliTorr) or less. The furnace may be heated to approximately 650° C. (1200° F.) at a rate of approximately 14° C./minute (25° F./minute). Once approximately 650° C. (1200° F.) is attained, this temperature may be maintained for approximately 30 minutes. Then the furnace temperature may be increased to approximately 980° C. (1800° F.) at a rate of approximately 14° C./minute (25° F./minute). Once approximately 980° C. (1800° F.) is attained, this temperature may be maintained for approximately 30 minutes. Then the furnace temperature may be increased to approximately 1204 to 1218° C. (2200 to 2225° F.) at a rate of approximately 19° C./minute (35° F./minute). Once approximately 1204 to 1218° C. (2200 to 2225° F.) is attained, this temperature may be maintained for approximately 20 minutes. In even some embodiments, a cooling cycle sub-step may include a controlled cooling of the brazing furnace with the pre-sintered preform 120 and the substrate (e.g., turbine bucket shroud 108) inside to approximately 1120° C. (2050° F.) and maintaining that temperature for approximately 60 minutes. Then the furnace may be further cooled to approximately 815° C. (1500° F.). The furnace may finally be subsequently cooled to approximately room temperature. While specific temperatures, times and ramp rates are disclosed herein, it should be appreciated that these are intended to be exemplary and non-limiting.

The pre-sintered preform 120 may comprise a variety of shapes based on the non-z-notch contact surface 111 undergoing modification. Specifically, the pre-sintered preform 120 comprises a shape matching the non-z-notch contact surface 111 it is bonded to. Such embodiments can allow for the consistent and convenient modification on one or more non-z-notch contact surfaces 111 by repairing or replacing some of the original material with new material that is already sized and shaped to substantially conform with the original geometry of the substrate.

For example, in some embodiments, such as that illustrated in FIG. 3, the non-z-notch contact surface 111 may comprise the one or more seal rails 112. In such embodiments, the pre-sintered preform 120 may comprise a seal rail shape (i.e., a shape matching the substantially parallel seal rail geometry). In other embodiments, the non-z-notch contact surface 111 may comprise one or both of the z-notch adjacent surfaces 116. In such embodiments, the pre-sintered preform 120 may comprise a substantially flat plate to match the relative z-notch adjacent surface 116 it is bonded to. In even some embodiments, the non-z-notch contact surface 111 may comprise at least a portion of the angel wings 118. In such embodiments, the pre-sintered preform 120 may similarly comprise a substantially flat plate to match the relative angel wing 118 it is bonded to.

It should be appreciated that the pre-sintered preform 120 as disclosed and described herein may be shaped into any suitable shape using any suitable technique. For example, as disclosed above, the pre-sintered preform 120 may be partially sintered in a furnace to assist in hold said shape prior to bonding with the substrate (e.g., one or more portions of a turbine bucket 102 such part of the shroud 108 or angel wings 118).

Referring now to FIGS. 1-2 and 4-5, in some embodiments, a modified component may comprise the pre-sintered preform 120 in addition to a heat resistant material 130 at least partially covering the pre-sintered preform 120. Such embodiments may facilitate the protection of the pre-sintered preform 120 during future heat treatments to avoid or reduce dimensional instability of the underlying pre-sintered preform 120. Future heat treatments include any application of elevated temperature for the modification of one or more parts of the component. For example, when the component comprises a turbine bucket 102, the component may be subject to future heat treatments such as rejuvenation cycles, future brazing applications, welding modifications, joining processes or the like, all which may impart an elevated temperature to the pre-sintered preform.

For example, the pre-sintered preform 120 may already be disposed in and bonded to the substrate (e.g., a shroud 108, cooling channel 117, angel wing 118, etc.) of the component (e.g., turbine bucket 102). In some embodiments, a turbine bucket 102 may comprise one or more pre-sintered preforms 120 disposed in one or more cooling channels 117 in its shroud 108 so as to close or otherwise stop off one end of the one or more cooling channels 117. Such stop offs may be utilized, for example, when cooling channels 117 were stem drilled through the shroud 108 and a stop off is required to redirect the air flow there through.

In even some embodiments, the pre-sintered preform 120 may be present at one or more non-z-notch contact surfaces 111 such as from a previous modification process as discussed above. In other embodiments, the pre-sintered preform 120 may be present on any other type of substrate such as when the component comprises any other nickel-, cobalt-, or iron-based superalloys.

Figure 4:
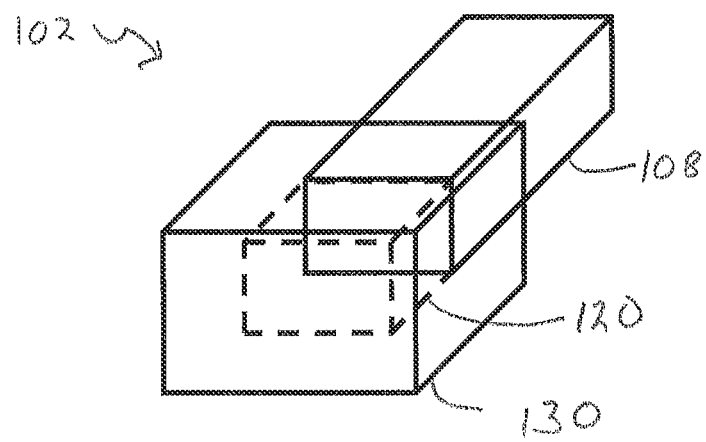
FIG. 4 is a schematic illustration of a modified component with a pre-sintered preform and a heat resistant material according to one or more embodiments shown or described herein.
Figure 5:
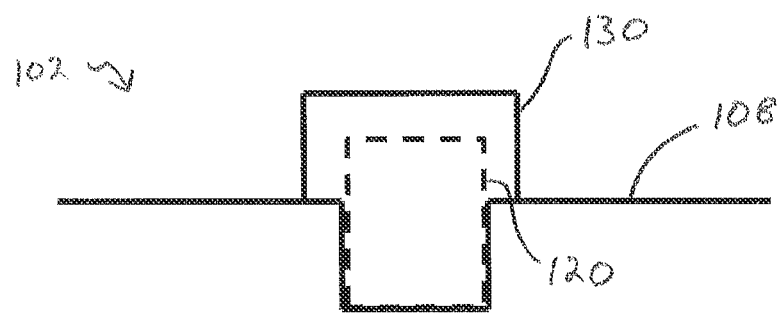
FIG. 5 is a cross sectional illustration of the modified component of FIG. 4 according to one or more embodiments shown or described herein.

As best illustrated in FIGS. 4 and 5, to facilitate the protection of the pre-sintered preform 120 from future heat applications, a heat resistant material 130 may at least partially cover the pre-sintered preform 120. The heat resistant material 130 may comprise any material or materials that can at least partially cover the pre-sintered preform 120 and has a melt temperature higher than that of the pre-sintered preform 120.

For example, in some embodiments, the heat resistant material 130 may comprise a powder material coating. Suitable powder material coatings may include, for example, powder alloys deposited onto the pre-sintered preform 120 using any suitable technique. For example, in some particular embodiments, the heat resistant material 130 may comprise Tribaloy T-800 applied via a high velocity oxy-fuel (HVOF) thermal spray application. In some embodiments, the heat resistant material 130 may comprise a braze material. The braze material may comprise any metal or alloy that can be at least partially melted and bonded to the pre-sintered preform 120. In even some embodiments, the heat resistant material 130 may itself comprise a separate pre-sintered preform that has a higher melt temperature of the pre-sintered preform already bonded to the substrate (such as through a different or greater amount of the base alloy). For example, in some embodiments, the heat resistant material 130 comprising the separate pre-sintered preform may comprise a base alloy of Tribaloy T-800 (such as from 90 to 95 weight percent or at about 92.5 weight percent) and/or a second alloy of MAR M-509B (such as from between 5 to 10 weight percent, or at about 8.5 weight percent). These embodiments may particularly facilitate modifications and/or heat operations when the component (e.g., turbine bucket 108) requires material addition to restore its original size and shape.

In some embodiments, the heat resistant material 130 may comprise a ceramic paint. The ceramic paint in such embodiments may comprise any material composition that has a higher melt temperature than that of the underlying pre-sintered preform 120. These embodiments may particularly facilitate modifications and/or heat operations when the component (e.g., turbine bucket 108) is already at or near its targeted size and shape since the ceramic paint will not add as significant of a thickness as other coating alternatives.

Depending on the application, the heat resistant material 130 may be further finished after the heat application, or may be left in a pre-finished state after the heat application such that the modified component (e.g., turbine bucket 102) may then be re-used in operation.

Figure 6:
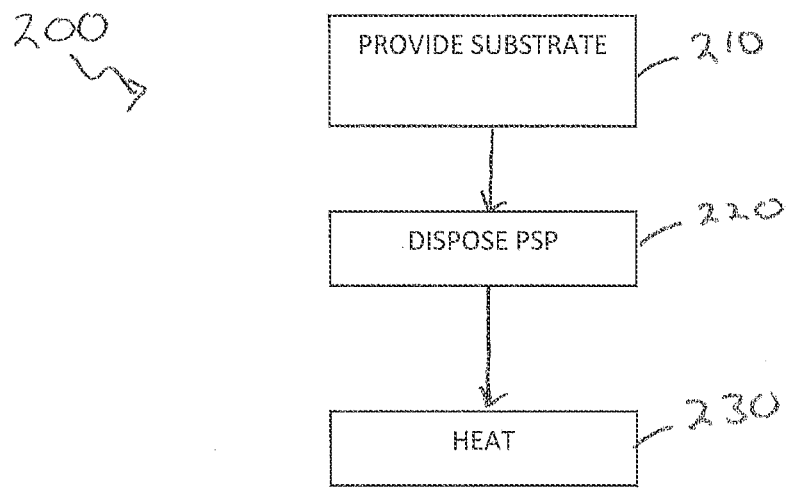
FIG. 6 is a flow chart of an exemplary braze method according to one or more embodiments shown or described herein.

Referring now additionally to FIG. 6, a method 200 is illustrated for brazing a substrate such as a turbine bucket 102 in accordance with one or more of the embodiments disclosed herein. The method 200 first comprises providing a substrate (e.g., turbine component 102) in step 210, wherein the substrate (e.g., turbine component 102 comprises a modification surface that includes non-z-notch contact surface 111. In some embodiments, providing the substrate in step 210 may comprise preparing the modification surface such as by removing material and/or cleaning via any suitable mechanical or chemical method such as a nicro-blast.

The method 200 then comprises disposing a pre-sintered preform 120 on the modification surface (e.g., seal rail 112, z-notch adjacent surface 116, or angel wings 118) in step 220 and heating said pre-sintered preform 120 in step 230 to bond the pre-sintered preform 120 to the modification surface. As discussed above, the temperature, heat source(s), iterations, ramp rate, hold time, cycle and any other relevant parameters of heat application in step 230 can be adjusted so as to bond the pre-sintered preform 120 to the modification surface.

Figure 7:
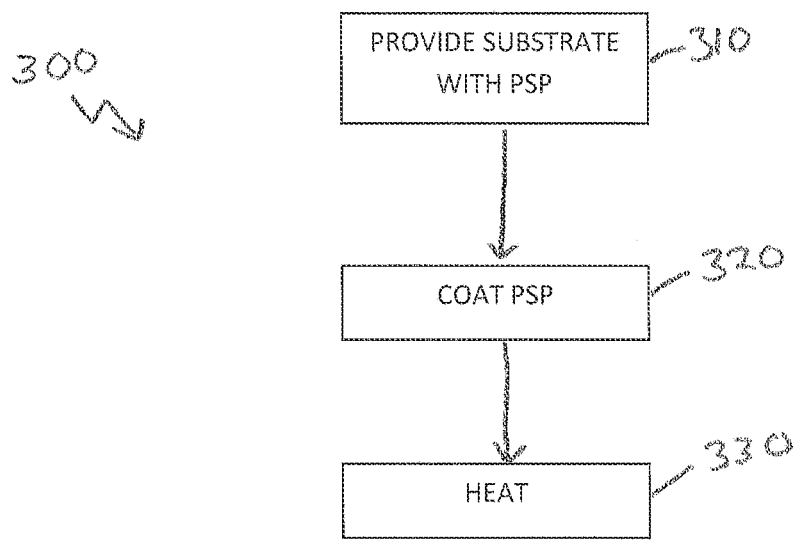
FIG. 7 is a flow chart of another exemplary braze method according to one or more embodiments shown or described herein.

Referring now additionally to FIG. 7, another method 300 is illustrated for brazing a substrate such as a turbine bucket 102 in accordance with one or more of the embodiments disclosed herein. The method 300 first comprises providing a substrate (e.g., turbine component 102) in step 310, wherein the substrate (e.g., turbine component 102 already comprises a pre-sintered preform 120. As disclosed herein, suitable, but non-limiting, examples include turbine bucket shrouds 108 that comprise pre sintered preforms 120 acting as stop offs in one or more cooling channels 117 or even turbine buckets 102 comprising one or more pre-sintered preforms 120 bonded to one or more non-z-notch contact surfaces 111.

The method 300 then comprises at least partially covering the pre-sintered preform 120 with a heat resistant material 130 in step 320. As discussed above, the heat resistant material 130 has a melt temperature higher than that of the pre-sintered preform 120 such that it helps prevent or avoid any dimensional instability of the pre-sintered preform 120 during subsequent heat applications. The heat resistant material 130 can comprise, for example, a powder material coating, a braze, a separate pre-sintered preform or even a ceramic paint.

The method 300 further comprises heating said pre-sintered preform 120 in step 330 on the substrate (e.g., turbine bucket 102). As discussed above, the temperature, heat source(s), iterations, ramp rate, hold time, cycle and any other relevant parameters of heat application in step 330 can be adjusted as necessary to facilitate the relevant heat operation.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A braze method for a turbine shroud onto a substrate, the method comprising:

providing a substrate comprising a pre-sintered preform disposed thereon, the substrate comprising a plurality of Z-notches, a plurality of Z-notch contact surfaces and a plurality of non-Z-notch contact surfaces, the plurality of non-z-notch contact surfaces comprising one or more seal rails, wherein the pre-sintered preform comprises a mixture comprising a base alloy comprising about 30 weight percent to about 90 weight percent of the mixture and a second alloy comprising a sufficient amount of melting point depressant to have a lower melting temperature than the base alloy, the pre-sintered preform comprising a shape matching the plurality of non-z-notch contact surfaces and the one or more seal rails;

at least partially covering the pre-sintered preform with a heat resistant material, wherein a melt temperature of the heat resistant material is higher than a melt temperature of the pre-sintered preform, the heat resistant material reducing dimensional instability of the pre-sintered preform during subsequent heat applications of pre-sintered preform; and, heating the pre-sintered preform on the substrate.

2. The braze method of claim 1, wherein the heat resistant material comprises a separate pre-sintered preform.

3. The braze method of claim 2, wherein the separate pre-sintered preform comprises a base alloy and a second alloy, wherein the base alloy comprises a compositional range of, by weight, about 27.0 to 30.0% molybdenum, 16.5 to 18.5% chromium, 3.0 to 3.8% silicon, up to 1.5% iron, up to 1.5% nickel, up to 0.15% oxygen, up to 0.08% carbon, up to 0.03% phosphorus, up to 0.03% sulfur, and the balance cobalt, and wherein the second alloy comprises a compositional range of, by weight, about 22.9 to 24.75% chromium, 9.0 to 11.0% nickel, 6.5 to 7.6% tungsten, 3.0 to 4.0 percent tantalum, 2.6 to 3.16% boron, 0.55 to 0.65% carbon, 0.3 to about 0.6% zirconium, 0.15 to 0.3% titanium, up to 1.3% iron, up to 0.4% silicon, up to 0.1% manganese, up to 0.02% sulfur and the balance cobalt.

4. The braze method of claim 2, wherein the separate pre-sintered preform comprises, by weight, from about 90 to about 95% base alloy and from about 5 to about 10% second alloy.

5. The braze method of claim 1, wherein the heat resistant material comprises a powder material coating.

6. The braze method of claim 5, wherein the powder material coating comprises a compositional range of, by weight, about 27.0 to 30.0% molybdenum, 16.5 to 18.5% chromium, 3.0 to 3.8% silicon, up to 1.5% iron, up to 1.5% nickel, up to 0.15% oxygen, up to 0.08% carbon, up to 0.03% phosphorus, up to 0.03% sulfur, and the balance cobalt.

7. The braze method of claim 1, wherein the heat resistant material comprises a braze material.

8. The braze method of claim 1, wherein the heat resistant material comprises a ceramic paint.

9. The braze method of claim 1, wherein the substrate comprises a turbine bucket shroud.

10. The braze method of claim 9, wherein the pre-sintered preform is disposed in a cooling channel of the turbine bucket shroud.

11. The braze method of claim 1, wherein the substrate comprises a nickel-, cobalt, or iron-based superalloy.

* * * * *